United States Patent
Ngai

(10) Patent No.: US 8,626,179 B2
(45) Date of Patent: Jan. 7, 2014

(54) MULTIPLE SUBSCRIPTION RESOURCE ACCESS CONTROL

(75) Inventor: Francis M. Ngai, Boulder, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 13/235,086

(22) Filed: Sep. 16, 2011

(65) Prior Publication Data

US 2012/0231802 A1    Sep. 13, 2012

Related U.S. Application Data

(60) Provisional application No. 61/450,418, filed on Mar. 8, 2011.

(51) Int. Cl.
| | | |
|---|---|---|
| H04W 72/00 | (2009.01) | |
| H04M 1/66 | (2006.01) | |
| H04W 4/00 | (2009.01) | |
| H04B 7/00 | (2006.01) | |
| H04M 1/00 | (2006.01) | |
| H04B 1/38 | (2006.01) | |
| H04B 7/216 | (2006.01) | |
| H04L 12/66 | (2006.01) | |
| H04M 9/00 | (2006.01) | |
| H04W 68/00 | (2009.01) | |

(52) U.S. Cl.
USPC ..... 455/450; 455/411; 455/435.1; 455/452.1; 455/452.2; 455/452.3; 455/454; 455/458; 455/518; 455/552.1; 455/558; 370/329; 370/335; 370/352; 379/433.09

(58) Field of Classification Search
USPC ........ 455/411, 435.1, 450, 452.1, 452.2, 453, 455/454, 458, 518, 552.1, 558; 370/352, 370/329, 335; 379/433.09
See application file for complete search history.

(56) References Cited

U.S. PATENT DOCUMENTS

| 8,170,616 B2 | 5/2012 | Lee |
|---|---|---|
| 8,204,516 B2 | 6/2012 | Hsu |

(Continued)

FOREIGN PATENT DOCUMENTS

| EP | 1131973 | 4/2003 |
|---|---|---|
| WO | WO2010140781 A2 | 12/2010 |

OTHER PUBLICATIONS

Ahmed, Z., et al., "A Navigation Device with MAC Supporting Multiple Physical Networks for Extended Coverage and Operations", IEEE Transactions on Consumer Electronics, vol. 54, No. 3, Aug. 2008; 7 pp.

(Continued)

*Primary Examiner* — Inder Mehra
(74) *Attorney, Agent, or Firm* — James T. Hagler

(57) ABSTRACT

A particular method includes receiving multiple requests to access a signal processing resource of a device that supports multiple subscriptions during a first time period. During the first time period, a first subscription is granted access to the signal processing resource, and a second subscription is denied access to the signal processing resource. A remedial action policy and historical information related to subscription access to the signal processing resource may be used to determine whether to grant access to the signal processing resource to the second subscription during a second time period. When access to the signal processing resource is granted to the second subscription during the second time period, hysteresis may be used to determine whether to grant access to the first subscription during a third time period after the second time period in order to preserve paging performance of the first subscription.

24 Claims, 8 Drawing Sheets

(56) References Cited

U.S. PATENT DOCUMENTS

| | | |
|---|---|---|
| 8,244,301 B2 | 8/2012 | Shi |
| 8,290,518 B2 | 10/2012 | Fang et al. |
| 2001/0034233 A1 | 10/2001 | Tiedemann et al. |
| 2003/0181216 A1 | 9/2003 | Tsai et al. |
| 2006/0052066 A1* | 3/2006 | Cleveland et al. ............ 455/101 |
| 2006/0189346 A1 | 8/2006 | Turner et al. |
| 2006/0209801 A1 | 9/2006 | Joshi et al. |
| 2007/0197234 A1 | 8/2007 | Gill et al. |
| 2008/0075039 A1 | 3/2008 | Srinivas et al. |
| 2008/0102815 A1* | 5/2008 | Sengupta et al. ............ 455/424 |
| 2008/0182615 A1 | 7/2008 | Xue et al. |
| 2009/0131054 A1 | 5/2009 | Zhang |
| 2009/0156256 A1 | 6/2009 | Shi |
| 2009/0156257 A1 | 6/2009 | Shi |
| 2009/0186651 A1 | 7/2009 | You |
| 2010/0130237 A1 | 5/2010 | Kitazoe et al. |
| 2010/0261487 A1 | 10/2010 | Razdan |
| 2010/0279698 A1 | 11/2010 | Wong |
| 2011/0081951 A1* | 4/2011 | Hwang ........................ 455/558 |
| 2011/0117962 A1* | 5/2011 | Qiu et al. ..................... 455/558 |
| 2011/0151836 A1* | 6/2011 | Dadu et al. .................. 455/411 |
| 2012/0225651 A1* | 9/2012 | Rysgaard ................... 455/435.1 |

OTHER PUBLICATIONS

International Search Report and Written Opinion—PCT/US2012/028127—ISA/EPO—May 3, 2012.

* cited by examiner

Persistent contentions/collisions

Pre-determined pattern for 1:1 resource allocation

| SCI = 2.... Telescoping page retransmissions....2 repeat pages at 5 sec and 15 sec after 1st page | | | | | | | | | | | |
|---|---|---|---|---|---|---|---|---|---|---|---|
| Sub #1 gets paged | P | P | | | P | | << Sub #1 has 2 chances | | | | |
| Wakeup # | 1 | 2 | 3 | 4 | 5 | 6 | 7 | 8 | 9 | 10 | |
| Sub #1 gets lock | N | Y | N | Y | N | Y | N | Y | N | Y | Avg # pages/call = 1/2 × (2+1) = 1.5 |
| Sub #2 gets lock | Y | N | Y | N | Y | N | Y | N | Y | N | |
| Sub #2 gets paged | P | P | | P | | << Sub #2 has 1 chances | | | | | |

Persistent contentions/collisions

Pre-determined pattern for 2:1 resource allocation

| SCI = 2.... Telescoping page retransmissions....2 repeat pages at 5 sec and 15 sec after 1st page | | | | | | | | | | |
|---|---|---|---|---|---|---|---|---|---|---|
| Sub #1 gets 1st page @ Wakeup #3 | | | P | P | P | P | | | | |
| Sub #1 gets 1st page @ Wakeup #2 | | P | P | P | | | | | | |
| Sub #1 gets 1st page @ Wakeup #1 | P | P | | P | | | | | | << Effective average # pages per call for Sub #1 = 1/3 x (0 + 1 + 2) = 1.... And expect miss 1/3 of calls |
| Wakeup # | 1 | 2 | 3 | 4 | 5 | 6 | 7 | 8 | 9 | 10 |
| Sub #1 gets lock | N | N | Y | N | N | Y | N | N | Y | N |
| Sub #2 gets lock | Y | Y | N | Y | Y | N | Y | Y | N | Y |
| Sub #2 gets 1st page @ Wakeup #1 | P | P | | P | | | | | | |
| Sub #2 gets 1st page @ Wakeup #2 | | P | | P | P | | | | | << Effective average # pages per call for Sub #2 = 1/3 x (3 + 2 + 1) = 2 |
| Sub #2 gets 1st page @ Wakeup #3 | | | P | P | | P | | | | |

*FIG. 4*

MULTIPLE SUBSCRIPTION RESOURCE ACCESS CONTROL

I. CLAIM OF PRIORITY

The present application claims priority from U.S. Provisional Patent Application No. 61/450,418 filed on Mar. 8, 2011, the contents of which are expressly incorporated herein by reference in their entirety.

II. FIELD

The present disclosure is generally related to devices that support multiple subscriptions that share signal processing resources.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application that can be used to access the Internet. As such, these wireless telephones can include significant computing capabilities.

A mobile communication device (e.g., a wireless telephone) may enable a user to utilize multiple subscriptions (that may be associated with the same or different networks). To illustrate, a first subscriber identity module (SIM) of a dual-SIM dual-standby (DSDS) device may be associated with a first subscription and a second SIM may be associated with a second subscription. In a DSDS device with a single receive-transmit (Rx-Tx) chain, there may be contention between subscriptions in accessing one or more shared radio frequency (RF) resources of the single Rx-Tx chain. For example, when there is a contention for access to a shared RF resource (e.g., a paging collision), a first subscription may be granted access to the shared RF resource (i.e., "win") over a second subscription. As a result, the second subscription may "lose" and get "whatever's left," potentially resulting in degradation of performance of the second subscription. While DSDS devices may support dual-subscription concurrency by using two separate dedicated Rx-Tx chains for the two subscriptions, this may lead to a higher bill of materials (BOM) and a larger printed circuit board (PCB) area.

IV. SUMMARY

Performance of one subscription (e.g., a secondary subscription) of a device that supports multiple subscriptions may be degraded compared to another subscription (e.g., a primary subscription) as a result of contention for one or more shared signal processing resources (e.g., RF resources). Application of a remedial action policy and use of historical information related to subscription access to a signal processing resource may improve the performance of the secondary subscription. That is, one or more remedial actions may be taken in order to improve a user experience and call performance associated with the primary and secondary subscriptions.

In particular embodiment, a method includes receiving a first set of requests to access a signal processing resource (e.g., a radio frequency (RF) resource) of a device (that supports multiple subscriptions) during a first time period. Each subscription may be associated with its own user identity module, or each subscription may be associated with a common user identity module. For example, the device may include a first subscriber identity module (SIM) associated with a first subscription and a second SIM associated with a second subscription. At least one of the requests received during the first time period is related to the first subscription, and at least one of the requests is related to the second subscription. During the first time period, the first subscription is granted access to the signal processing resource and the second subscription is denied access to the signal processing resource. A second set of requests to access the signal processing resource are received during a second time period. At least one of the requests received during the second time period is related to the first subscription, and at least one of the requests is related to the second subscription. The method includes determining whether to grant access to the signal processing resource to the second subscription during the second time period and to deny access to the signal processing resource to the first subscription during the second time period. The determination may be based on a remedial action policy and evaluation of historical information related to subscription access to the signal processing resource. When access to the signal processing resource is granted to the second subscription during the second time period, hysteresis may be used to determine whether to grant access to the signal processing resource to the first subscription during a third time period after the second time period in order to preserve paging performance of the first subscription.

In another particular embodiment, an apparatus includes a signal processing resource, a first SIM interface, a second SIM interface, and a controller. The first SIM interface, the second SIM interface, and the controller are communicatively coupled to the signal processing resource. The first SIM interface is configured to receive a first SIM associated with a first subscription, and the second SIM interface is configured to receive a second SIM associated with a second subscription. During a first time period, a first set of requests to access the signal processing resource may be received. At least one of the requests received during the first time period is related to the first subscription, and at least one of the requests is related to the second subscription. The controller is configured to grant access to the signal processing resource to the first subscription during the first time period and to deny access to the signal processing resource to the second subscription during the first time period. During a second time period, a second set of requests to access the signal processing resource may be received. At least one of the requests received during the second time period is related to the first subscription, and at least one of the requests is related to the second subscription. The controller is configured to determine, based on a remedial action policy and based on historical information related to subscription access to the signal processing resource, whether to grant access to the signal processing resource to the second subscription during the second time period. When access to the signal processing resource is granted to the second subscription during the second time period, hysteresis may be used to determine whether to grant access to the signal processing resource to the first subscription during a third time period after the second time period in order to preserve paging performance of the first subscription.

In another particular embodiment, an apparatus includes means for receiving a first SIM that is associated with a first subscription and means for receiving a second SIM that is associated with a second subscription. The apparatus further includes means for receiving a first set of requests to access a signal processing resource during a first time period. At least one of the requests is related to the first subscription and at least one of the requests is related to the second subscription. The apparatus includes means for granting access to the signal processing resource to the first subscription and denying access to the second subscription during the first time period. The apparatus includes means for receiving a second set of requests to access the signal processing resource during a second time period, where at least one request is related to the first subscription and at least one request is related to the second subscription. The apparatus further includes means for determining whether to grant access to the signal processing resource to the second subscription (and to deny access to the signal processing resource to the first subscription) during the second time period. The determination may be based on a remedial action policy and based on historical information related to subscription access to the signal processing resource. When access to the signal processing resource is granted to the second subscription during the second time period, hysteresis may be used to determine whether to grant access to the signal processing resource to the first subscription during a third time period after the second time period in order to preserve paging performance of the first subscription.

One particular advantage provided by at least one of the disclosed embodiments is that performance of a dual-subscription device (e.g., a dual-SIM dual-standby device) with a single Rx-Tx chain may be improved. For example, one or more remedial actions may be taken to improve the performance of a subscription that may be degraded as a result of contention for one or more shared signal processing resources. Hysteresis may be used to preserve paging performance of a particular subscription (e.g., a higher priority subscription).

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 3 is a chart that illustrates a first particular embodiment of a method of arbitrating access to a shared signal processing resource of a dual-subscription device;

FIG. 4 is a chart that illustrates a second particular embodiment of a method of arbitrating access to a shared signal processing resource of a dual-subscription device;

VI. DETAILED DESCRIPTION

The present disclosure relates to resolution of contention for one or more signal processing resources (e.g., RF resources) in devices that support multiple subscriptions (e.g., multi-subscription devices). As an example, a device that supports two subscriptions (e.g., a DSDS device) may share one receive-transmit (Rx-Tx) chain. Each subscription may request RF resources for a set of reasons, and each reason may be associated with a numeric priority and a duration. A "collision" may occur when there is an overlap in the durations requested by the two subscriptions. Such collisions may be transient or persistent in nature. By arbitrating access to the RF resources, performance may be improved in order to provide a user experience that is closer to a device that supports a single subscription. Further, by arbitrating access to the RF resources, performance of a secondary subscription may be improved. Hysteresis may be used so that paging performance of the primary subscription is not degraded below an acceptable level as a result of the secondary subscription being granted access to the RF resources instead of the primary subscription.

Figure 1:
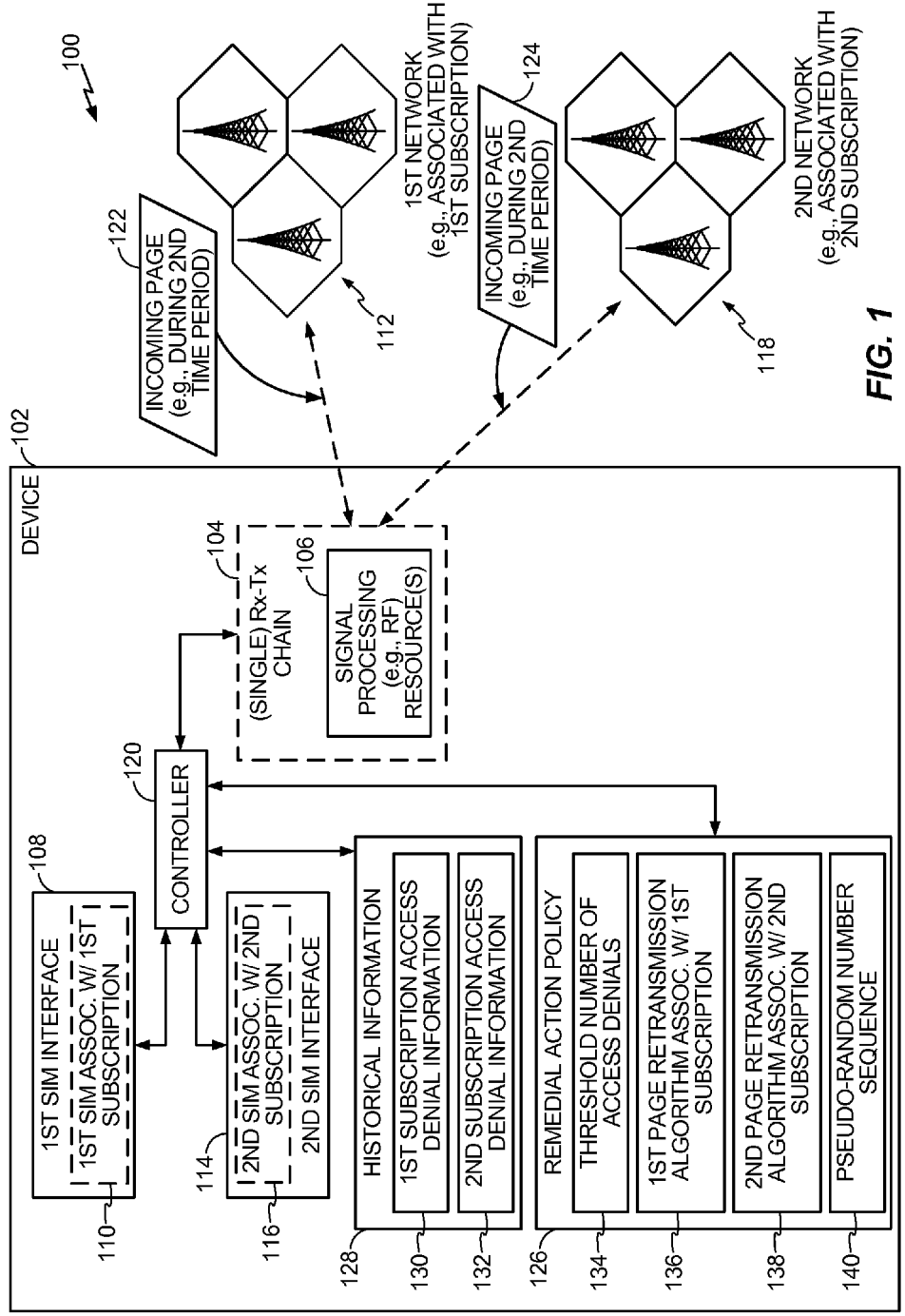
FIG. 1 is a diagram of a particular illustrative embodiment of a system of arbitrating access to a shared signal processing resource of a dual-subscription device.

Referring to FIG. 1, a particular embodiment of a system of arbitrating access to at least one shared signal processing resource of a dual-subscription device is illustrated and is generally designated 100. The system 100 includes a device 102 that supports multiple subscriptions (e.g., a mobile telephone or other communication device). For example, each subscription may be associated with its own user identity module (UIM), such as a subscriber identity module (SIM), a code division multiple access (CDMA) removable UIM (R-UIM), or other type of R-UIM. In the embodiment illustrated in FIG. 1, the device 102 is capable of receiving multiple SIMs. For example, in the embodiment illustrated in FIG. 1, the device 102 is a dual-SIM device with a single receive-transmit (Rx-Tx) chain 104 that includes at least one signal processing (e.g., RF) resource 106. The device 102 includes a first SIM interface 108 to receive a first SIM 110 that is associated with a first subscription (e.g., a subscription associated with a first network 112) and a second SIM interface 114 to receive a second SIM 116 that is associated with a second subscription (e.g., a subscription associated with a second network 118). Alternatively, the two subscriptions may be associated with the same network. For example, the SIMs 110, 116 may be plugged into or otherwise connected to the respective SIM interfaces 108, 114. The first SIM interface 108, the second SIM interface 114, and a controller 120 may be communicatively coupled to the signal processing resource 106 (e.g., via electrical connections between the SIM interfaces 108, 114, the controller 120, and the signal processing resource 106). To illustrate, a first electrical connection between the first SIM interface 108 and the signal processing resource 106 may provide a communication path between the first SIM 110 and the signal processing resource 106 when the first SIM 110 is connected to the first SIM interface 108. As another example, a second electrical connection between the second SIM interface 114 and the signal processing resource 106 may provide a communication path between the second SIM 116 and the signal processing resource 106 when the second SIM 116 is connected to the second SIM interface 114. Thus, both SIMs 110, 116 may be concurrently connected to the signal processing resource 106 (e.g., via the SIM interfaces 108, 114).

The controller 120 is configured to receive a first set of requests to access the signal processing resource 106 during a first time period. At least one of the first set of requests is related to the first subscription (e.g., associated with the first SIM 110), and at least one of the first set of requests is related to the second subscription (e.g., associated with the second SIM 116). During the first time period, the controller 120 is configured to grant access to the signal processing resource 106 to the first subscription and to deny access to the signal processing resource 106 to the second subscription. For example, the first subscription may be a higher priority subscription than the second subscription. As such, access to the signal processing resource 106 may be granted to the higher priority subscription and may be denied to a lower priority subscription.

The controller 120 is configured to receive a second set of requests to access the signal processing resource 106 during a second time period. At least one of the second set of requests is related to the first subscription and at least one of the second set of requests is related to the second subscription. The controller 120 is configured to determine, based on a remedial action policy 126 and based on historical information 128 related to subscription access to the signal processing resource 106, whether to grant access to the signal processing resource 106 to the first or second subscription during the second time period. The controller 120 may be configured to grant access to the signal processing resource 106 to the second subscription (and to deny access to the signal processing resource 106 to the first subscription) based on the determination. In this case, the second subscription "wins" the contention for access to the shared signal processing resource 106, and the first subscription "loses" the contention for access to the signal processing resource 106. In a particular embodiment, the controller 120 may be further configured to use hysteresis to determine whether to grant access to the signal processing resource 106 to the first subscription (e.g., a higher priority primary subscription) during a third time period that is after the second time period in order to preserve paging performance of the first subscription.

Figure 2:
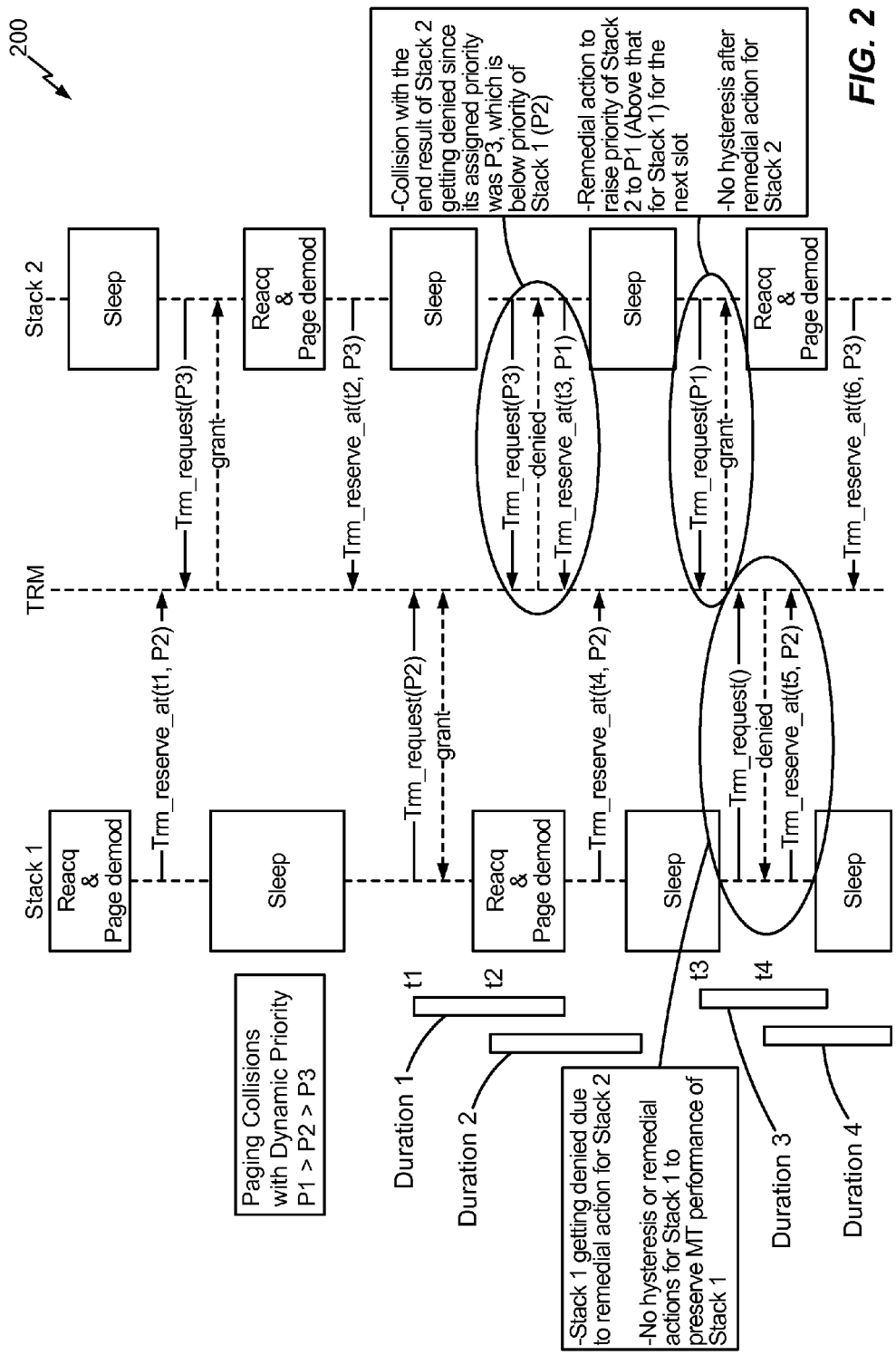
FIG. 2 is a ladder diagram of a particular illustrative embodiment of a method of performing a remedial action in response to one subscription being denied access to a shared signal processing resource of a dual-subscription device.

When requested access periods overlap, a collision takes place. Such collisions may be transient or persistent in nature. As an illustrative example (see FIG. 2), the first subscription may request access to the signal processing resource 106 at time t1 for duration 1, and the second subscription may request access to the signal processing resource 106 at time t2 for duration 2. As another illustrative example (see FIG. 2), the first subscription may request access to the signal processing resource 106 at time t4 for duration 4, and the second subscription may request access to the signal processing resource 106 at time t3 for duration 3. As shown in FIG. 2, in each case, the time periods overlap, resulting in contention for the signal processing resource 106 (e.g., collisions).

During operation of the system 100 of FIG. 1, the controller 120 may receive a first set of requests to access the signal processing resource 106 during a first time period. To illustrate, the controller 120 may receive a request from the first subscription to access the signal processing resource 106 (e.g., an RF resource) at a first time and for a first duration in order to receive an incoming page (not shown in FIG. 1) from the first network 112. The controller 120 may receive another request from the second subscription to access the signal processing resource 106 at a second time and for a second duration in order to receive an incoming page (not shown in FIG. 1) from the second network 118. The first time and the second time may be the same or different. Further, the first duration and the second duration may be the same or different. In one embodiment, the first subscription and the second subscription operate under a common slot cycle index (SCI) and hash to a common paging slot. In this case, the contention for access to the signal processing resource 106 may be considered "persistent" in nature.

When the requested access periods overlap, the controller 120 may grant access to the signal processing resource 106 to the first subscription during the first time period such that the incoming page associated with the first subscription may be received from the first network 112. The controller 120 may deny access to the signal processing resource 106 to the second subscription, such that the incoming page associated with the second subscription may be "missed" (i.e., not received from the second network 118). For example, the first subscription may be considered a higher priority subscription than the second subscription. As such, the controller 120 may grant access to the signal processing resource 106 to the first subscription over the second subscription.

The controller 120 may receive a second set of requests to access the signal processing resource 106 during a second time period. To illustrate, the controller 120 may receive a request from the first subscription to access the signal processing resource 106 at a third time and for a third duration in order to receive an incoming page 122 from the first network 112. The controller 120 may receive another request from the second subscription to access the signal processing resource 106 at a fourth time and for a fourth duration in order to receive an incoming page 124 from the second network 118. The third time and the fourth time may be the same or different, and the third duration and the fourth duration may be the same or different.

When the requested access periods overlap, the controller 120 may determine, based on a remedial action policy 126 and based on historical information 128, whether to grant access to the signal processing resource 106 to the first or second subscription during the second time period. As illustrated in FIG. 1, the historical information 128 may include at least first subscription access denial information 130 and second subscription access denial information 132. For example, the first subscription access denial information 130 may include at least information associated with the controller 120 granting access to the signal processing resource 106 to the first subscription during the first time period. As another example, the second subscription access denial information 132 may include at least information associated with the controller 120 denying access to the signal processing resource 106 to the second subscription during the first time period.

When the controller 120 grants access to the signal processing resource 106 to the second subscription during the second time period, the controller 120 may deny access to the signal processing resource 106 to the first subscription during the second time period. As a result, the incoming page 122 associated with the first subscription may be "missed" (i.e., not received from the first network 112). When the controller 120 grants access to the signal processing resource 106 to the first subscription during the second time period, the controller 120 may deny access to the signal processing resource 106 to the second subscription during the second time period. As a result, the incoming page 124 associated with the second subscription may be "missed" (i.e., not received from the second network 118).

In a particular embodiment, the remedial action policy 126 may define a threshold number of access denials 134 before the second subscription is granted access to the signal processing resource 106 during the second time period. In this case, the controller 120 may grant access to the signal processing resource 106 to the second subscription during the second time period when a number of times that the second subscription has been denied access to the signal processing resource 106 satisfies the threshold number of access denials 134. The number of times that the second subscription has been denied access to the signal processing resource 106 may be determined based on the second subscription access denial information 132. For example, the second subscription access denial information 132 may include a count of an absolute number of access denials or a count of a number of consecutive access denials. In the case of a number of consecutive access denials, the count may be reset when the second subscription is granted access to the signal processing resource 106 (e.g., during the second time period or during a subsequent time period).

The remedial action policy 126 may indicate that remedial actions may not be invoked for certain reasons or requests (e.g., a request to access the signal processing resource 106 to obtain a football game score may be denied). For example, if collisions are transient in nature and there are multiple retransmissions for non-emergency broadcast messages, the remedial action policy 126 may specify that remedial actions are not to be invoked when a subscription requested RF resources for demodulating or monitoring non-emergency broadcast messages and "lost" the contention (e.g., when the subscription was denied access to the signal processing resource 106).

In a particular embodiment, a numeric priority may be associated with various requests (or reasons associated with a request). When a numeric priority associated with a particular request (or reason for the particular request) that lost the contention is below a threshold, the remedial action policy 126 may specify that remedial actions are not to be invoked. To illustrate, a numeric priority associated with a request to access the signal processing resource 106 for a football game score may be low (e.g., a numeric priority of 10) while a numeric priority associated with a request to access the signal processing resource 106 to monitor for an incoming voice call may be high (e.g., a numeric priority of 200). The remedial action policy 126 may specify that remedial actions are not to be invoked when the numeric priority is less than a threshold value such as 100. In this case, remedial actions may not be invoked when a request to access the signal processing resource 106 for a football game score (e.g., a request with a numeric priority less than 100) lost a contention. By contrast, remedial actions may be invoked when a request to access the signal processing resource 106 to monitor for an incoming voice call (e.g., a request with a numeric priority greater than 100) lost a contention. As another example, the remedial action policy 126 may specify that remedial actions are not to be invoked when a difference in numeric priorities involved in the contention is above a threshold. The remedial action policy 126 may specify that remedial actions are not to be invoked when the difference in numeric priorities is greater than a threshold value such as 100. To illustrate, remedial actions may be invoked when a request to access the signal processing resource 106 to monitor for an incoming voice call lost a contention with a request to access the signal processing resource 106 for a football game score (e.g., a difference in numeric priorities of 190).

Thus, adaptive, dynamic, context-sensitive remedial actions may be taken for a subscription that lost an initial contention. That is, future access to the signal processing resource 106 may be granted to the subscription that lost one or more previous contentions. The access grants may occur at different points in time for different subscriptions. For page monitoring, remedial actions may take place at subsequent paging slots where repeat pages are expected. In a particular embodiment, the remedial action policy 126 may be determined at least in part based on a first page retransmission algorithm 136 associated with the first subscription and a second page retransmission algorithm 138 associated with the second subscription. The first page retransmission algorithm 136 may be determined by the first network 112, and the second page retransmission algorithm 138 may be determined by the second network 118. Thus, in this case, network specific information regarding the page retransmission algorithms 136, 138 may be required in order to implement the remedial action policy 126. Alternatively, access may be granted for the next N paging slots to the subscription that lost the initial contention in order to cover the time span of the page retransmissions. However, a large N may adversely affect the paging performance of the subscription that "won" the initial contention. In an alternative embodiment, the remedial action policy 126 may define a pseudo-random number sequence 140 that is used to determine whether to grant access to the signal processing resource 106 to the subscription that lost the initial contention during the second time period. For non-emergency broadcast monitoring, remedial actions may occur at subsequent broadcast slots, not necessarily at the next immediate broadcast slot.

If the device 102 is in a weak coverage area, enhancements to one or more modem algorithms may be made be used to improve the performance of the subscription that lost the initial contention (e.g., the second subscription). For page monitoring, losing a contention for RF resources at one paging slot may result in a longer time that elapses between a last instance of page monitoring and a next instance of page monitoring. Possible enhancements to modem algorithms may include deeper searches, earlier wakeups and more recovery mechanisms during reacquisition in slotted mode, the enablement of receive diversity (RxD) capabilities of the modem, and other techniques to enhance demodulation performance of the modem.

In a particular embodiment, when access to the signal processing resource 106 is granted to the second subscription (e.g., a lower priority subscription) during the second time period, hysteresis may be used to determine whether to grant access to the signal processing resource 106 to the first subscription (e.g., a higher priority primary subscription) during a third time period that is after the second time period in order to preserve paging performance of the first subscription. For example, the controller 120 may use the first subscription access denial information 130 to determine whether paging performance of the first subscription (e.g., the higher priority subscription) is unsatisfactory. When the paging performance is determined to be unsatisfactory, the controller 120 may grant access to the signal processing resource 106 to the first subscription during the third time period.

As an illustrative example, the third time period may include paging slots associated with the first subscription that overlap with paging slots associated with the second subscription. In this case, the controller 120 may grant access to the signal processing resource 106 to the first subscription in order to monitor the next N paging slots from the first network 112 that overlap with paging slots from the second network 118. As another illustrative example, the third time period may include a predetermined period of time to grant access to the signal processing resource 106 to the first subscription.

Granting access to the first subscription during the third time period may preserve paging performance of the first subscription (e.g., the higher priority subscription).

FIG. 1 illustrates that the remedial action policy 126 and historical information 128 related to subscription access to the signal processing resource 106 may be used to improve the performance of a subscription that lost an initial contention for the signal processing resource 106. Further, when a remedial action is taken to improve the performance of the subscription that lost the initial contention, hysteresis may be used to determine whether to grant access to the signal processing resource 106 to the other subscription (e.g., a higher priority subscription) in order to preserve paging performance of the subscription.

Referring to FIG. 2, a ladder diagram illustrates a particular embodiment of a method of performing a remedial action in response to one subscription being denied access to a shared signal processing resource of a dual-subscription device and is generally designated 200.

A first subscription (e.g., associated with Stack 1) may request access to a signal processing resource (e.g., the signal processing resource 106 of FIG. 1). The first subscription sends a request to a transceiver receiver manager (TRM) to request access at time t1 for duration 1 in order to perform a reacquisition and page demodulation procedure. A priority of P2 may be assigned to the request from the first subscription. A second subscription (e.g., associated with Stack 2) may request access to the signal processing resource at time t2 for duration 2 in order to perform a reacquisition and page demodulation procedure. A lower priority of P3 may be assigned to the request from the second subscription. As shown in FIG. 2, there is an overlap in the first duration and the second duration, resulting in a contention for the signal processing resource. Based on a priority comparison, the request from the first subscription wins the contention (i.e., the access request is granted), and the request from the second subscription loses the contention (i.e., the access request is denied). As such, the second subscription is unable to perform the reacquisition and page demodulation procedure at time t2, potentially resulting in a missed page.

A remedial action may be taken to improve the performance of the second subscription after the second subscription "lost" the initial contention for the signal processing resource. The second subscription may request access to the signal processing resource at time t3 for duration 3 in order to perform a reacquisition and page demodulation procedure. The first subscription may request access to the signal processing resource at time t4 for duration 4 in order to perform a reacquisition and page demodulation procedure. As shown in FIG. 2, there is an overlap in the third duration and the fourth duration, resulting in a contention for the signal processing resource. The remedial action may include raising a priority level associated with the access request from the second subscription to P1 (above the priority level of P2 associated with the first subscription). As a result, the request from the second subscription wins the contention, and the request from the first subscription loses the contention.

If the first subscription is a primary subscription (i.e., a higher priority subscription), hysteresis may be used to preserve paging performance of the first subscription as a result of the denial of the request at time t4. For example, the signal processing resource may be granted to the paging slots of the first subscription where retransmissions after time t4 are expected, and there may be no remedial actions for the second subscription if contentions occur at these potential repeat paging slots for the first subscription. As another example, the first subscription may win the next N contentions after time t4, and there may be no remedial actions for the second subscription for these N contentions. As a further example, the first subscription may win the contentions over a time window T after time t4, and there may be no remedial actions for the second subscription if contentions occur during the time window T.

FIG. 2 illustrates that the performance of a subscription that "lost" an initial contention for a signal processing resource may be improved by raising a priority level associated with a subsequent request for access to the signal processing resource such that the subsequent access request may be granted. Further, hysteresis may be used to preserve paging performance of one subscription (e.g., a higher priority primary subscription) after a remedial action is taken to improve the performance of another subscription (e.g., a lower priority secondary subscription).

Referring to FIG. 3, a chart illustrates a particular embodiment of a method of arbitrating access to a shared signal processing resource of a dual-subscription device and is generally designated 300.

One example of persistent contentions/collisions is a code division multiple access (CDMA) plus CDMA ("C+C") case, where two subscriptions operate under the same slot cycle index (SCI) and hash to the same paging slot. A predetermined pattern of resource sharing (e.g., sharing access to the signal processing resource 106 of FIG. 1) may be adopted based on an understanding of different retransmission algorithms of different network providers. The pattern of resource sharing may be based on the relative priority of the two subscriptions. Increasing the number of page retransmissions may mitigate the number of missed calls that result from persistent contentions/collisions.

In the embodiment illustrated in FIG. 3, the two subscriptions have the same priority (i.e., a 1:1 resource allocation). FIG. 3 illustrates that for a slot cycle index (SCI) of 2, telescoping page retransmissions (e.g., 2 repeat pages at approximately 5 seconds and 15 seconds after the first page) may result in an effective average number of pages per call of 1.5. As an alternative to the pre-determined pattern of 1:1 resource allocation illustrated in FIG. 3, pseudo-random (uncorrelated) number sequences may be used to determine a pattern of resource sharing when the two subscriptions have the same priority. As another alternative, using an N-level pseudo-random number sequence and comparing random variables with threshold derived from a cumulative distribution function (CDF) of random variable to arbitrate signal processing resources between the two subscriptions may enable articulation of different levels of relative priorities between the two subscriptions. For example, a uniform random number generator that produces an output including random integers from 1 to 10 with an equal probability of each number (i.e., a 1/10 probability for each number) may be used. Utilizing the uniform random number generator that produces random integers from 1 to 10, the threshold may be set to a predetermined value of 7 such that the first subscription "wins" if the random number produced from the uniform random number generator is less than or equal to 7 (i.e., <=7) and the second subscription "wins" if the random number is greater than or equal to 8 (i.e., >=8). Accordingly, in cases of persistent collisions at each paging slot, the output of the uniform random number generator is compared to the threshold and an average pattern of 7:3 resource sharing is achieved. FIG. 3 illustrates that a predetermined pattern of resource sharing between two subscriptions that have the same priority may provide improved performance with respect to persistent contentions/collisions.

Referring to FIG. 4, a chart illustrates a particular embodiment of a method of arbitrating access to a shared signal processing resource of a dual-subscription device and is generally designated 400.

In the embodiment illustrated in FIG. 4, the two subscriptions have different priorities (e.g., a 2:1 resource allocation). FIG. 4 illustrates that for a slot cycle index (SCI) of 2, telescoping page retransmissions (e.g., 2 repeat pages at approximately 5 seconds and 15 seconds after the first page) may result in an effective average number of pages per call of 2 for the second subscription (i.e., the higher priority subscription in this example). With respect to the first subscription (i.e., the lower priority subscription in this example), the effective average number of pages per call is 1, with one third of calls expected to be missed. FIG. 4 illustrates that a pattern of resource sharing may be determined according to the relative priorities of the two subscriptions.

Figure 5:
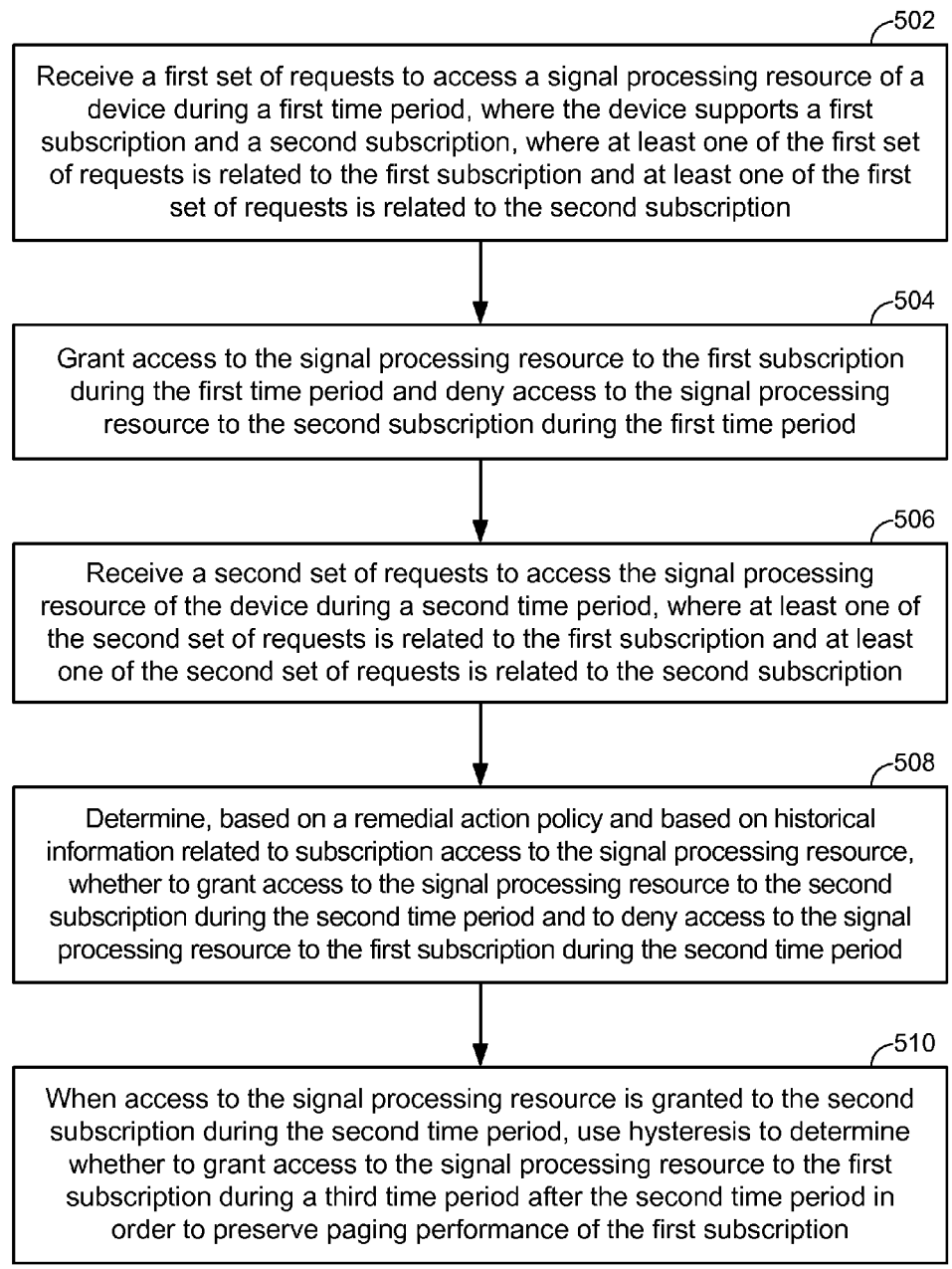
FIG. 5 is a flow chart of an illustrative embodiment of a method of arbitrating access to a shared signal processing resource of a dual-subscription device.

Referring to FIG. 5, a flow chart of a particular embodiment of a method of arbitrating access to a shared signal processing resource of a dual-subscription device is illustrated.

The method includes receiving a first set of requests to access a signal processing resource of a device that supports multiple subscriptions during a first time period, at 502. The device may include a first SIM associated with a first subscription and a second SIM associated with a second subscription. In a particular embodiment, the device includes the device 102 of FIG. 1 that includes the first SIM 110 (associated with a first subscription that may be provided by the first network 112) and the second SIM 116 (associated with a second subscription that may be provided by the second network 118). At least one request received during the first time period is related to the first subscription and at least one request is related to the second subscription.

The method includes granting access to the signal processing resource to the first subscription during the first time period and denying access to the signal processing resource to the second subscription during the first time period, at 504. For example, the controller 120 of FIG. 1 may grant access to the signal processing resource 106 to the first subscription and deny access to the signal processing resource 106 to the second subscription during the first time period.

The method includes receiving a second set of requests to access the signal processing resource of the device during a second time period, at 506. At least one request received during the second time period is related to the first subscription and at least one request is related to the second subscription. As an illustrative example, during the second time period, the controller 120 of FIG. 1 may receive a request to access the signal processing resource 106 (e.g., an RF resource) in order to receive the incoming page 122 from the first network 112 and another request to access the signal processing resource 106 in order to receive the incoming page 124 from the second network 118.

The method includes determining, based on a remedial action policy and based on historical information related to subscription access to the signal processing resource, whether to grant access to the signal processing resource to the second subscription and to deny access to signal processing resource to the first subscription during the second time period, at 508. For example, the controller 120 of FIG. 1 may determine whether to grant access to the signal processing resource 106 to the second subscription in order to receive the incoming page 124 from the second network 118. The determination may be based on the remedial action policy 126 and the historical information 128.

When access to the signal processing resource is granted to the second subscription during the second time period, at 508, the method includes using hysteresis to determine whether to grant access to the first subscription during a third time period that is after the second time period, at 510. Granting access to the first subscription during the third time period may preserve paging performance of the first subscription. For example, the controller 120 of FIG. 1 may use hysteresis to determine whether to grant access to the signal processing resource 106 to the first subscription during a third time period in order to preserve paging performance of the first subscription.

FIG. 5 illustrates that application of a remedial action policy and use of historical information related to subscription access to a signal processing resource may improve the performance of a subscription that lost an initial contention for the signal processing resource. That is, one or more remedial actions may be taken in order to provide a more similar user experience and call performance for the two subscriptions.

Figure 6:
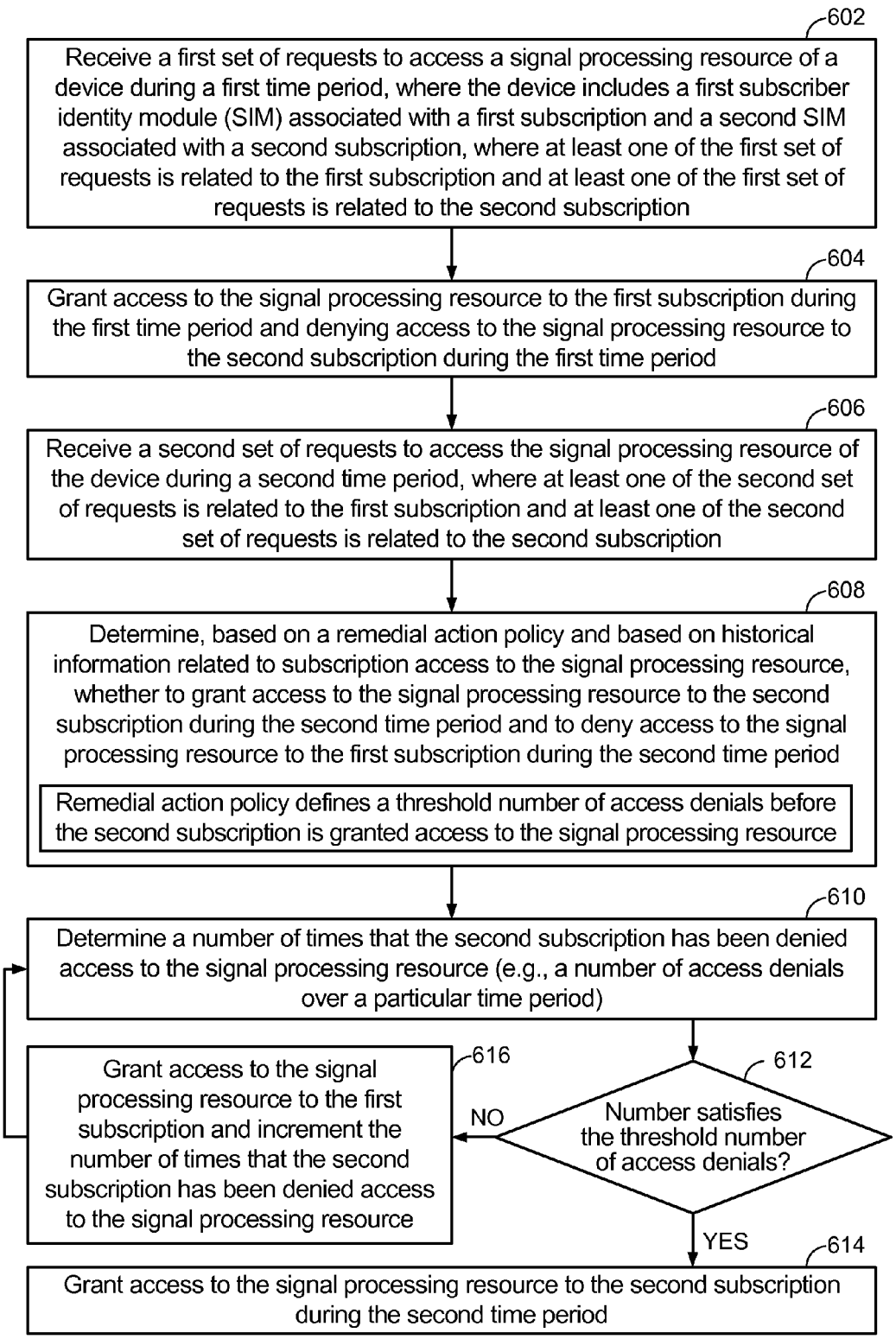
FIG. 6 is a flow chart of an illustrative embodiment of a method of performing a remedial action in response to one subscription being denied access to a shared signal processing resource of a dual-subscription device.

Referring to FIG. 6, a flow chart of a particular embodiment of a method of performing a remedial action in response to one subscription being denied access to a shared signal processing resource of a dual-subscription device is illustrated.

The method includes receiving a first set of requests to access a signal processing resource of a device that supports multiple subscriptions during a first time period, at 602. The device may include a first SIM associated with a first subscription and a second SIM associated with a second subscription. At least one request received during the first time period is related to the first subscription and at least one request is related to the second subscription. The method includes granting access to the signal processing resource to the first subscription during the first time period and denying access to the signal processing resource to the second subscription during the first time period, at 604. For example, the device may include the device 102 of FIG. 1, and the controller 120 may grant access to the signal processing resource 106 to the first subscription and deny access to the signal processing resource 106 to the second subscription during the first time period.

The method includes receiving a second set of requests to access the signal processing resource of the device during a second time period, at 606. At least one request received during the second time period is related to the first subscription and at least one request is related to the second subscription. The method includes determining, based on a remedial action policy and based on historical information related to subscription access to the signal processing resource, whether to grant access to the signal processing resource to the second subscription and to deny access to signal processing resource to the first subscription during the second time period, at 608.

In the embodiment illustrated in FIG. 6, the remedial action policy defines a threshold number of access denials before the second subscription is granted access to the signal processing resource. In this case, the method may include determining a number of times that the second subscription has been denied access to the signal processing resource, at 610. In one embodiment, the number of times that the second subscription has been denied access to the signal processing resource represents a number of access denials over a particular time period. The method includes determining whether the number of access denials satisfies a threshold number of access denials, at 612. When the number satisfies the threshold number of access denials, the second subscription is granted access to the signal processing resource during the second time period, at 614. Otherwise, when the number does not satisfy the threshold number of access denials, the first subscription is granted access to the signal processing resource and the number of times the second subscription has been denied access to the signal processing resource is incremented, at 616. After 616, the method may return to 610 to arbitrate access to the signal processing resource during a subsequent time period.

As an illustrative example, the controller 120 of FIG. 1 may receive a request to access the signal processing resource 106 (e.g., an RF resource) during the second time period in order to receive the incoming page 122 from the first network 112 and another request to access the signal processing resource 106 in order to receive the incoming page 124 from the second network 118. The controller 120 may determine the number of times that the second subscription has been denied access to the signal processing resource 106 based on the second subscription access denial information 132. The number of times that the second subscription has been denied access may be a number of access denials over a particular period of time.

The controller 120 may compare the number of access denials to the threshold number of access denials 134 of the remedial action policy 126. When the number of access denials satisfies the threshold number of access denials 134, the controller 120 may grant access to the signal processing resource 106 to the second subscription during the second time period. As such, the incoming page 124 from the second network 118 may be received, and the incoming page 122 from the first network 112 may not be received. When the number of access denials does not satisfy the threshold number of access denials 134, the controller 120 may grant access to the signal processing resource 106 to the first subscription during the second time period and increment the number of access denials associated with the second subscription. As such, the incoming page 122 from the first network 112 may be received, and the incoming page 124 from the second network 118 may not be received. When access to the signal processing resource is granted to the second subscription during the second time period, at 614, hysteresis may be used to determine whether to grant access to the first subscription during a third time period that is after the second time period. Granting access to the first subscription during the third time period may preserve paging performance of the first subscription.

FIG. 6 illustrates that application of a remedial action policy and use of historical information related to subscription access to a signal processing resource may improve the performance of a subscription that lost an initial contention. For example, the remedial action policy may define a threshold number of access denials before the subscription is granted access to the signal processing resource. When the number of access denials satisfies the threshold number of access denials, access to the signal processing resource may be granted to the subscription.

Figure 7:
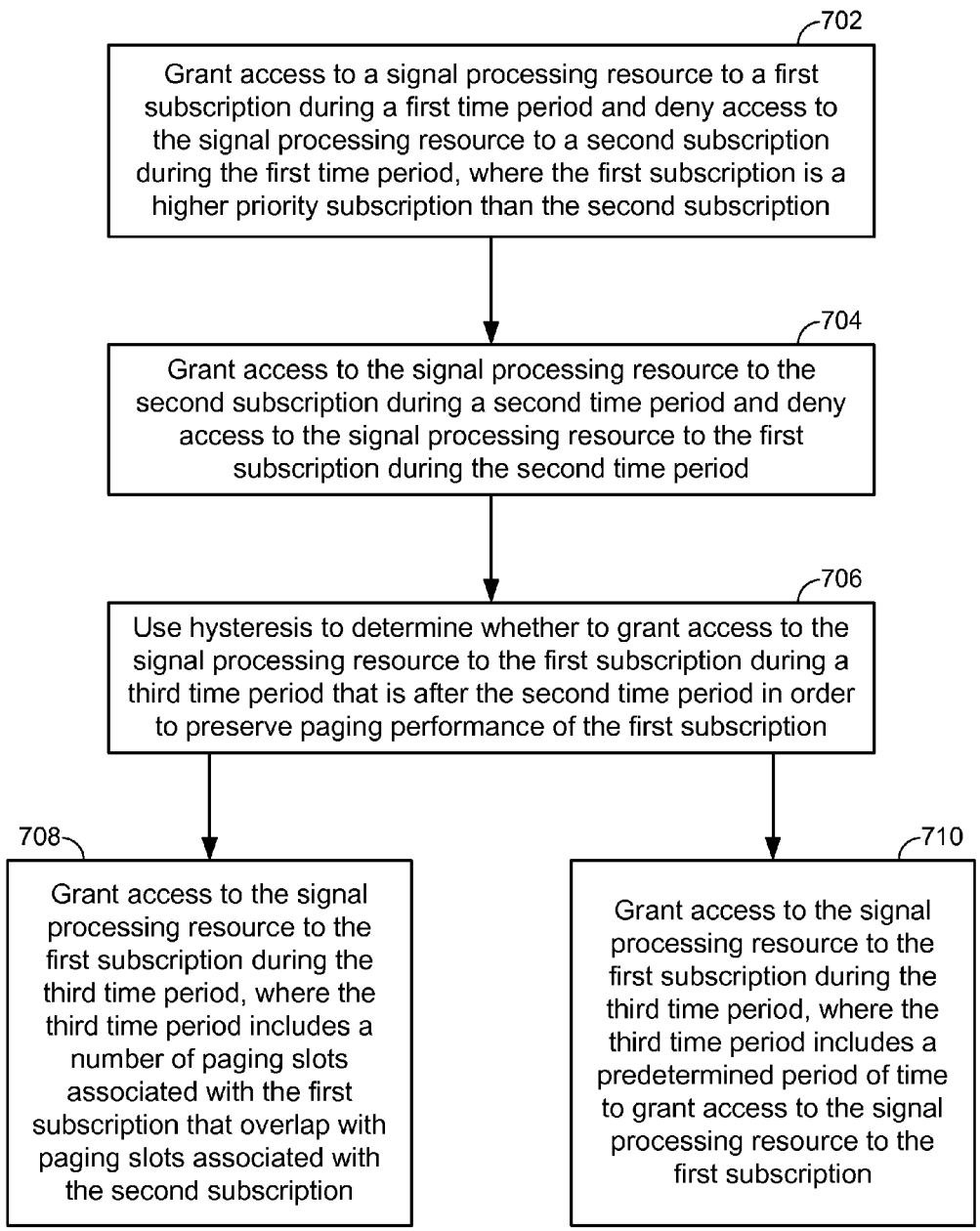
FIG. 7 is a flow chart of an illustrative embodiment of a method of using hysteresis to preserve paging performance of a higher priority subscription of a dual-subscription device.

Referring to FIG. 7, a flow chart of a particular embodiment of a method of using hysteresis to preserve paging performance of a higher priority subscription of a dual-subscription device is illustrated.

The method includes granting access to a signal processing resource to a first subscription during a first time period and denying access to the signal processing resource to a second subscription during the first time period, at 702. The first subscription may be a higher priority subscription than the second subscription. For example, the device may include the device 102 of FIG. 1, and the controller 120 may grant access to the signal processing resource 106 to the first subscription (e.g., the higher priority subscription) and deny access to the signal processing resource 106 to the second subscription (e.g., the lower priority subscription) during the first time period.

The method includes granting access to the signal processing resource to the second subscription (e.g., the lower priority subscription) during a second time period and denying access to the first subscription (e.g., the higher priority subscription) during the second time period, at 704. For example, the controller 120 of FIG. 1 may receive a request to access the signal processing resource 106 (e.g., an RF resource) during the second time period in order to receive the incoming page 122 from the first network 112 and another request to access the signal processing resource 106 in order to receive the incoming page 124 from the second network 118. The controller 120 may determine, based on the remedial action policy 126 and the historical information 128, to grant access to the signal processing resource 106 to the second subscription during the second time period. As such, the incoming page 124 from the second network 118 may be received, and the incoming page 122 from the first network 112 may not be received.

The method may include using hysteresis to determine whether to grant access to the signal processing resource to the first subscription during a third time period that is after the second time period in order to preserve paging performance of the first subscription, at 706. For example, the first subscription access denial information 130 of FIG. 1 may be used to determine whether paging performance of the first subscription (e.g., the higher priority subscription) is unsatisfactory. When the paging performance is determined to be unsatisfactory, access to the signal processing resource 106 may be granted to the first subscription during the third time period.

In one embodiment, the method includes granting access to the signal processing resource to the first subscription during the third time period, where the third time period includes paging slots associated with the first subscription that overlap with paging slots associated with the second subscription, at 708. For example, the controller 120 of FIG. 1 may grant access to the signal processing resource 106 to monitor the next N paging slots from the first network 112 that overlap with paging slots from the second network 118 in order to preserve paging performance of the first subscription (e.g., the higher priority subscription).

In another embodiment, the method includes granting access to the signal processing resource to the first subscription during the third time period, where the third time period includes a predetermined period of time to grant access to the signal processing resource to the first subscription, at 710. For example, the controller 120 of FIG. 1 may grant access to the signal processing resource 106 to monitor paging slots from the first network 112 during the predetermined period of time in order to preserve paging performance of the first subscription (e.g., the higher priority subscription).

FIG. 7 illustrates that hysteresis may be used so that paging performance of a primary subscription is not degraded below an acceptable level as a result of a secondary subscription being granted access to the RF resources instead of the primary subscription.

Figure 8:
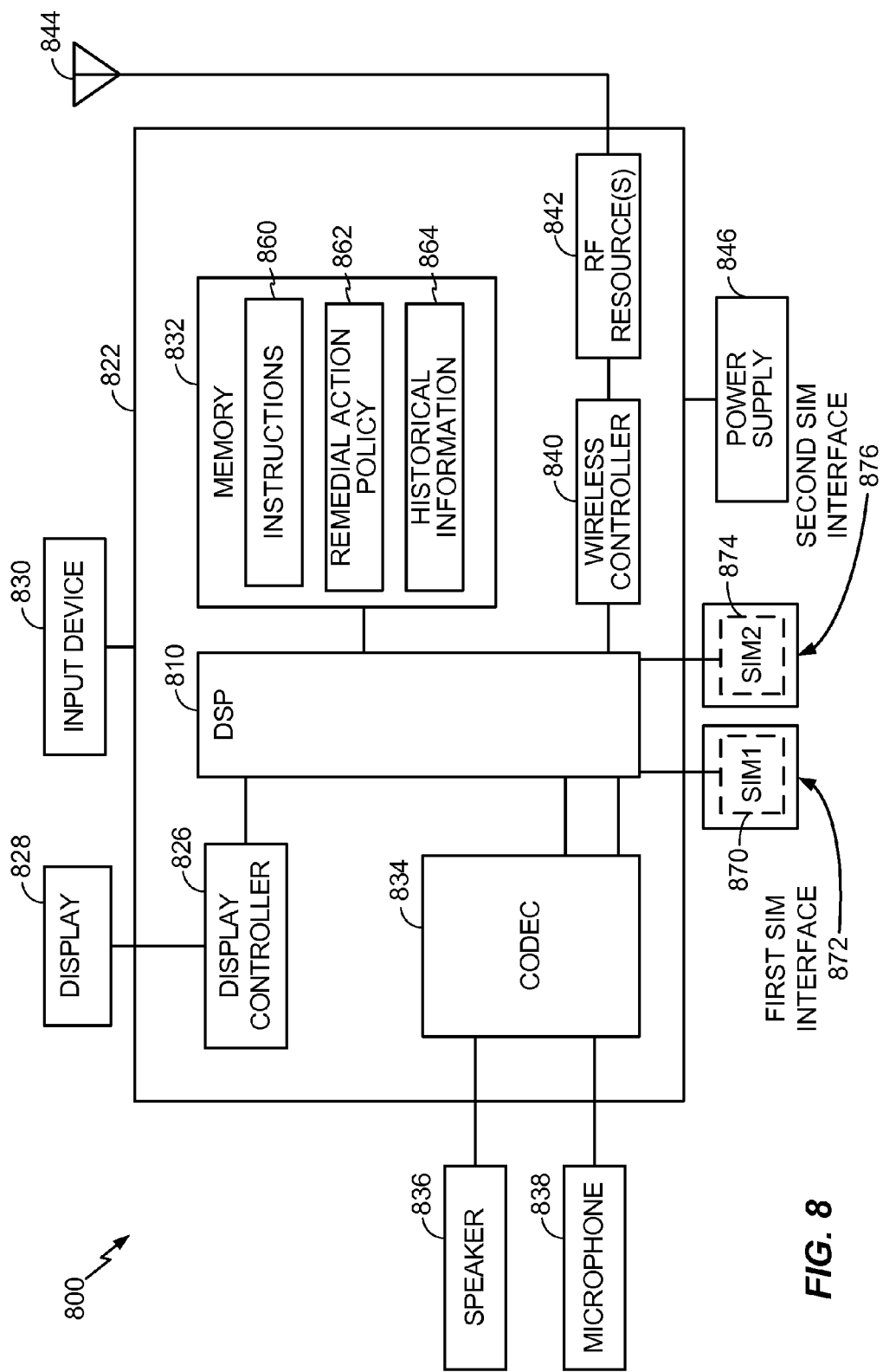
FIG. 8 is a block diagram of a portable electronic device that includes a controller to arbitrate access to a shared signal processing resource of a dual-subscription device.

Referring to FIG. 8, a block diagram of a particular illustrative embodiment of a portable electronic device is depicted and generally designated 800. In one embodiment, the portable electronic device 800 of FIG. 8 includes or is included within the device 102 of FIG. 1. Further, all or part of the methods described in FIGS. 2-7 may be performed at or by the portable electronic device 800 of FIG. 8. The portable electronic device 800 includes a processor, such as a digital signal processor (DSP) 810, coupled to a memory 832. The memory 832 is a computer readable tangible medium that stores instructions 860, at least one remedial action policy 862, and historical information 864. The instructions 860 may be executable by the DSP 810.

In the embodiment illustrated in FIG. 8, the portable electronic device 800 includes a first SIM interface 872 and a second SIM interface 876. The first SIM interface 872 may perform the function of receiving a first SIM 872 that is associated with a first subscription, and the second SIM interface 876 may perform the function of receiving a second SIM 874 that is associated with a second subscription. For example, at least one of the SIM interfaces 872, 876 may be a SIM card connector that includes a body having an accommodating space for a SIM card and multiple connected-through receptacles for receiving conducting terminals of a received SIM card. An electrical signaling contact with the SIM card can be made through the conducting terminals and the receptacles. An example interface may include a serial or parallel (e.g., 6-pin or 8-pin) connection. Further, multiple SIM card sizes may be accommodated (e.g., full-size, mini-SIM, or micro-SIM). In alternative embodiments, the portable electronic device 800 may not include multiple SIM interfaces when multiple subscriptions are associated with a common UIM (e.g., a common SIM).

FIG. 8 also shows a display controller 826 that is coupled to the digital signal processor 810 and to a display 828. A coder/decoder (CODEC) 834 can also be coupled to the digital signal processor 810. A speaker 836 and a microphone 838 can be coupled to the CODEC 834. FIG. 8 also indicates that a wireless controller 840 can be coupled to the digital signal processor 810, to one or more signal processing resources (e.g., RF resources 842), and to a wireless antenna 844. In a particular embodiment, the wireless controller 840 may include or be included within the controller 120 of FIG. 1, and the RF resources 842 may correspond to the signal processing resource(s) 106 of the single Rx-Tx chain 104 of FIG. 1.

The wireless controller 840 may perform the function of receiving a first set of requests to access a signal processing resource (e.g., one or more RF resources 842) during a first time period, where at least one of the first set of requests is related to the first subscription and at least one of the first set of requests is related to the second subscription. The wireless controller 840 may further perform the function of granting access to the signal processing resource to the first subscription during the first time period and denying access to the signal processing resource to the second subscription during the first time period. The wireless controller 840 may further perform the function of receiving a second set of requests to access the signal processing resource during a second time period, where at least one of the second set of requests is related to the first subscription and at least one of the second set of requests is related to the second subscription. The wireless controller 840 may further perform the function of determining, based on the remedial action policy 862 and based on the historical information 864 related to subscription access to the signal processing resource, whether to grant access to the signal processing resource to the second subscription during the second time period and to deny access to the signal processing resource to the first subscription during the second time period. In a particular embodiment, the wireless controller 840 may further perform the function of granting access to the signal processing resource to the second subscription during the second time period. The wireless controller 840 may further perform the function of determining whether to grant access to the signal processing resource to the first subscription during a third time period that is after the second time period in order to preserve paging performance of the first subscription (e.g., using hysteresis). The wireless controller 840 may further perform the function of granting access to the signal processing resource during the third time period.

In a particular embodiment, the DSP 810, the display controller 826, the memory 832, the CODEC 834, the wireless controller 840, and the RF resources 842 are included in a system-in-package or system-on-chip device 822. In a particular embodiment, an input device 830 and a power supply 846 are coupled to the system-on-chip device 822. Moreover, in a particular embodiment, as illustrated in FIG. 8, the display 828, the input device 830, the speaker 836, the microphone 838, the wireless antenna 844, the power supply 846, the first SIM 870, the first SIM interface 872, the second SIM 874, and the second SIM interface 876 are external to the system-on-chip device 822. However, each of the display 828, the input device 830, the speaker 836, the microphone 838, the wireless antenna 844, the power supply 846, the first SIM 870, the first SIM interface 872, the second SIM 874, and the second SIM interface 876 can be coupled to a component of the system-on-chip device 822, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
receiving a first set of requests to access a signal processing resource of a device during a first time period, wherein the device supports a first subscription and a second subscription, wherein at least one of the first set of requests is related to the first subscription and at least one of the first set of requests is related to the second subscription;
granting access to the signal processing resource to the first subscription during the first time period and denying access to the signal processing resource to the second subscription during the first time period;
receiving a second set of requests to access the signal processing resource of the device during a second time period, wherein at least one of the second set of requests is related to the first subscription and at least one of the second set of requests is related to the second subscription;
determining, based on a remedial action policy and based on historical information related to subscription access to the signal processing resource, whether to grant access to the signal processing resource to the second subscription during the second time period and to deny access to the signal processing resource to the first subscription during the second time period, wherein the remedial action policy defines a threshold number of access denials before the second subscription is granted access to the signal processing resource during the second time period; and
granting access to the signal processing resource during the second time period based on the determination.

2. The method of claim 1, wherein the second subscription is granted access to the signal processing resource during the second time period when a number of times that the second subscription has been denied access to the signal processing resource satisfies the threshold number of access denials.

3. The method of claim 1, wherein the second subscription is granted access to the signal processing resource during the second time period when a number of times that the second subscription has been denied access to the signal processing resource over a particular time period satisfies the threshold number of access denials.

4. The method of claim 1, wherein the signal processing resource includes a radio frequency resource.

5. The method of claim 1, wherein the first subscription is a higher priority subscription than the second subscription.

6. The method of claim 1, further comprising, when access to the signal processing resource is granted to the second subscription during the second time period, using hysteresis to determine whether to grant access to the signal processing resource to the first subscription during a third time period after the second time period in order to preserve paging performance of the first subscription.

7. The method of claim 6, further comprising granting access to the signal processing resource to the first subscription during the third time period, wherein the third time period includes paging slots associated with the first subscription that overlap with paging slots associated with the second subscription.

8. The method of claim 6, further comprising granting access to the signal processing resource to the first subscription during the third time period, wherein the third time period includes a predetermined period of time to grant access to the signal processing resource to the first subscription after granting access to the signal processing resource to the second subscription during the second time period.

9. An apparatus comprising:
a signal processing resource;
a first subscriber identity module (SIM) interface communicatively coupled to the signal processing resource, wherein the first SIM interface is configured to receive a first SIM associated with a first subscription;
a second SIM interface communicatively coupled to the signal processing resource, wherein the second SIM interface is configured to receive a second SIM associated with a second subscription; and
a controller communicatively coupled to the signal processing resource, wherein the controller is configured to:
receive a first set of requests to access the signal processing resource during a first time period, wherein at least one of the first set of requests is related to the first subscription and at least one of the first set of requests is related to the second subscription;
grant access to the signal processing resource to the first subscription during the first time period and deny access to the signal processing resource to the second subscription during the first time period;
receive a second set of requests to access the signal processing resource during a second time period, wherein at least one of the second set of requests is related to the first subscription and at least one of the second set of requests is related to the second subscription;
determine, based on a remedial action policy and based on historical information related to subscription access to the signal processing resource, whether to grant access to the signal processing resource to the second subscription during the second time period and to deny access to the signal processing resource to the first subscription during the second time period, wherein the remedial action policy defines a threshold number of access denials before the second subscription is granted access to the signal processing resource during the second time period; and
grant access to the signal processing resource during the second time period based on the determination.

10. The apparatus of claim 9, wherein the signal processing resource includes a radio frequency resource of a single receive-transmit chain.

11. The apparatus of claim 9, wherein the first subscription and the second subscription operate under a common slot cycle index and hash to a common paging slot.

12. An apparatus comprising:
means for receiving a first subscriber identity module (SIM) that is associated with a first subscription;
means for receiving a second SIM that is associated with a second subscription;
means for managing requests to access a signal processing resource, wherein the means for managing requests is configured to:
receive a first set of requests to access a signal processing resource during a first time period, wherein at least one of the first set of requests is related to the first subscription and at least one of the first set of requests is related to the second subscription;
grant access to the signal processing resource to the first subscription during the first time period and denying access to the signal processing resource to the second subscription during the first time period;

receive a second set of requests to access the signal processing resource during a second time period, wherein at least one of the second set of requests is related to the first subscription and at least one of the second set of requests is related to the second subscription;

determine, based on a remedial action policy and based on historical information related to subscription access to the signal processing resource, whether to grant access to the signal processing resource to the second subscription during the second time period and to deny access to the signal processing resource to the first subscription during the second time period, wherein the remedial action policy defines a threshold number of access denials before the second subscription is granted access to the signal processing resource during the second time period; and grant access to the signal processing resource during the second time period based on the determination.

13. The apparatus of claim 12, wherein the first subscription and the second subscription operate under a common slot cycle index and hash to a common paging slot.

14. A computer readable tangible medium comprising instructions that, when executed by a processor, cause the processor to:

receive a first set of requests to access a signal processing resource of a device during a first time period, wherein the device includes a first subscriber identity module (SIM) associated with a first subscription and a second SIM associated with a second subscription, wherein at least one of the first set of requests is related to the first subscription and at least one of the first set of requests is related to the second subscription;

grant access to the signal processing resource to the first subscription during the first time period and deny access to the signal processing resource to the second subscription during the first time period;

receive a second set of requests to access the signal processing resource of the device during a second time period, wherein at least one of the second set of requests is related to the first subscription and at least one of the second set of requests is related to the second subscription;

determine, based on a remedial action policy and based on historical information related to subscription access to the signal processing resource, whether to grant access to the signal processing resource to the second subscription during the second time period and to deny access to the signal processing resource to the first subscription during the second time period, wherein the remedial action policy defines a threshold number of access denials before the second subscription is granted access to the signal processing resource during the second time period; and grant access to the signal processing resource during the second time period based on the determination.

15. The computer readable tangible medium of claim 14, further comprising instructions that, when executed by the processor, cause the processor to:

when access to the signal processing resource is granted to the second subscription during the second time period, use hysteresis to determine whether to grant access to the signal processing resource to the first subscription during a third time period after the second time period in order to preserve paging performance of the first subscription;

determine a number of paging slots associated with the first subscription that overlap with paging slots associated with the second subscription during the third time period; and grant access to the signal processing resource to the first subscription during the third time period.

16. The computer readable tangible medium of claim 14, further comprising instructions that, when executed by the processor, cause the processor to:

when access to the signal processing resource is granted to the second subscription during the second time period, use hysteresis to determine whether to grant access to the signal processing resource to the first subscription during a third time period after the second time period in order to preserve paging performance of the first subscription; and grant access to the signal processing resource to the first subscription during the third time period, wherein the third time period includes a predetermined period of time to grant access to the signal processing resource to the first subscription after granting access to the signal processing resource to the second subscription during the second time period.

17. A method comprising:

receiving a first set of requests to access a signal processing resource of a device during a first time period, wherein the device supports a first subscription and a second subscription, wherein at least one of the first set of requests is related to the first subscription and at least one of the first set of requests is related to the second subscription;

granting access to the signal processing resource to the first subscription during the first time period and denying access to the signal processing resource to the second subscription during the first time period;

receiving a second set of requests to access the signal processing resource of the device during a second time period, wherein at least one of the second set of requests is related to the first subscription and at least one of the second set of requests is related to the second subscription;

determining, based on a remedial action policy and based on historical information related to subscription access to the signal processing resource, whether to grant access to the signal processing resource to the second subscription during the second time period and to deny access to the signal processing resource to the first subscription during the second time period, wherein the remedial action policy is determined at least in part based on a first page retransmission algorithm associated with the first subscription and a second page retransmission algorithm associated with the second subscription; and granting access to the signal processing resource during the second time period based on the determination.

18. The method of claim 17, wherein the second subscription is granted access to the signal processing resource during the second time period when a first paging slot associated with the first page retransmission algorithm overlaps with a second paging slot associated with the second page retransmission algorithm.

19. An apparatus comprising:
a signal processing resource;
a first subscriber identity module (SIM) interface communicatively coupled to the signal processing resource, wherein the first SIM interface is configured to receive a first SIM associated with a first subscription;

a second SIM interface communicatively coupled to the signal processing resource, wherein the second SIM interface is configured to receive a second SIM associated with a second subscription; and a controller communicatively coupled to the signal processing resource, wherein the controller is configured to:

receive a first set of requests to access the signal processing resource during a first time period, wherein at least one of the first set of requests is related to the first subscription and at least one of the first set of requests is related to the second subscription;

grant access to the signal processing resource to the first subscription during the first time period and deny access to the signal processing resource to the second subscription during the first time period;

receive a second set of requests to access the signal processing resource during a second time period, wherein at least one of the second set of requests is related to the first subscription and at least one of the second set of requests is related to the second subscription;

determine, based on a remedial action policy and based on historical information related to subscription access to the signal processing resource, whether to grant access to the signal processing resource to the second subscription during the second time period and to deny access to the signal processing resource to the first subscription during the second time period, wherein the remedial action policy is determined at least in part based on a first page retransmission algorithm associated with the first subscription and a second page retransmission algorithm associated with the second subscription; and grant access to the signal processing resource during the second time period based on the determination.

20. The apparatus of claim 19, wherein the controller is further configured to grant access to the signal processing resource to the second subscription during the second time period when a first paging slot associated with the first page retransmission algorithm overlaps with a second paging slot associated with the second page retransmission algorithm.

21. A method comprising:

receiving a first set of requests to access a signal processing resource of a device during a first time period, wherein the device supports a first subscription and a second subscription, wherein at least one of the first set of requests is related to the first subscription and at least one of the first set of requests is related to the second subscription;

granting access to the signal processing resource to the first subscription during the first time period and denying access to the signal processing resource to the second subscription during the first time period;

receiving a second set of requests to access the signal processing resource of the device during a second time period, wherein at least one of the second set of requests is related to the first subscription and at least one of the second set of requests is related to the second subscription;

determining, based on a remedial action policy and based on historical information related to subscription access to the signal processing resource, whether to grant access to the signal processing resource to the second subscription during the second time period and to deny access to the signal processing resource to the first subscription during the second time period, wherein the remedial action policy defines a pseudo-random number sequence that is used to determine whether to grant the second subscription access to the signal processing resource during the second time period; and granting access to the signal processing resource during the second time period based on the determination.

22. The method of claim 21, wherein a value based on the pseudo-random number sequence and corresponding to the second time period is compared to a threshold to determine whether to grant the second subscription access to the signal processing resource during the second time period, and wherein the threshold corresponds to a difference in a relative priority between the first subscription and the second subscription.

23. An apparatus comprising:

a signal processing resource;

a first subscriber identity module (SIM) interface communicatively coupled to the signal processing resource, wherein the first SIM interface is configured to receive a first SIM associated with a first subscription;

a second SIM interface communicatively coupled to the signal processing resource, wherein the second SIM interface is configured to receive a second SIM associated with a second subscription; and a controller communicatively coupled to the signal processing resource, wherein the controller is configured to:

receive a first set of requests to access the signal processing resource during a first time period, wherein at least one of the first set of requests is related to the first subscription and at least one of the first set of requests is related to the second subscription;

grant access to the signal processing resource to the first subscription during the first time period and deny access to the signal processing resource to the second subscription during the first time period;

receive a second set of requests to access the signal processing resource during a second time period, wherein at least one of the second set of requests is related to the first subscription and at least one of the second set of requests is related to the second subscription;

determine, based on a remedial action policy and based on historical information related to subscription access to the signal processing resource, whether to grant access to the signal processing resource to the second subscription during the second time period and to deny access to the signal processing resource to the first subscription during the second time period, wherein the remedial action policy defines a pseudo-random number sequence that is used to determine whether to grant the second subscription access to the signal processing resource during the second time period; and grant access to the signal processing resource during the second time period based on the determination.

24. The apparatus of claim 23, wherein a value based on the pseudo-random number sequence and corresponding to the second time period is compared to a threshold to determine whether to grant the second subscription access to the signal processing resource during the second time period, and wherein the threshold corresponds to a difference in a relative priority between the first subscription and the second subscription.

* * * * *